(12) United States Patent
Jung et al.

(10) Patent No.: US 10,691,318 B2
(45) Date of Patent: Jun. 23, 2020

(54) ELECTRONIC DEVICE AND METHOD FOR OUTPUTTING THUMBNAIL CORRESPONDING TO USER INPUT

(71) Applicant: Samsung Electronics Co., Ltd., Gyeonggi-do (KR)

(72) Inventors: Yu Min Jung, Suwon-si (KR); Ba Do Lee, Seongnam-si (KR); Seo Young Lee, Suwon-si (KR); Hee Kuk Lee, Suwon-si (KR); Dae Kyu Shin, Suwon-si (KR); Ji Yoon Park, Yongin-si (KR); Dong Hyun Yeom, Bucheon-si (KR); Jung Eun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/662,193

(22) Filed: Jul. 27, 2017

(65) Prior Publication Data

US 2018/0032238 A1 Feb. 1, 2018

(30) Foreign Application Priority Data

Aug. 1, 2016 (KR) .................. 10-2016-0098119

(51) Int. Cl.
*G06F 3/0484* (2013.01)
*G06T 3/00* (2006.01)
(Continued)

(52) U.S. Cl.
CPC .......... *G06F 3/04845* (2013.01); *G06F 16/54* (2019.01); *G06F 16/583* (2019.01);
(Continued)

(58) Field of Classification Search
CPC ........ G06F 17/30247; G06F 17/30259; G06K 9/00375; G06K 9/6267; G06K 9/00288; G06K 9/6232
See application file for complete search history.

(56) References Cited

U.S. PATENT DOCUMENTS 8,009,921 B2 8/2011 Csurka
8,983,229 B2 3/2015 Park et al.
(Continued)

FOREIGN PATENT DOCUMENTS

KR 20140122952 A 10/2014
KR 10-2015-0071498 A1 6/2015
KR 20160033485 A 3/2016

OTHER PUBLICATIONS

International Search Report for International Application No. PCT/KR2017/007329, dated Oct. 24, 2017. (3 pages).
(Continued)

*Primary Examiner* — Samantha (Yuehan) Wang

(57) ABSTRACT

An electronic device includes a display, a processor and a memory that stores an image file having image data. The image data includes at least one object and metadata. The metadata includes information about an area corresponding to the at least one object and identification information of the at least one object. The processor outputs the area of the image file, which includes the identification information corresponding to a user input as a thumbnail of the image file, in the display in response to the user input.

20 Claims, 18 Drawing Sheets

(51) Int. Cl.
  *H04N 1/387*  (2006.01)
  *G06F 16/583*  (2019.01)
  *H04N 1/00*  (2006.01)
  *H04N 1/393*  (2006.01)
  *G06F 16/54*  (2019.01)
  *G06K 9/46*  (2006.01)
  *G06T 3/40*  (2006.01)
  *H04N 5/262*  (2006.01)

(52) U.S. Cl.
  CPC .................. *G06K 9/46* (2013.01); *G06T 3/00* (2013.01); *G06T 3/0012* (2013.01); *G06T 3/40* (2013.01); *H04N 1/00442* (2013.01); *H04N 1/387* (2013.01); *H04N 1/393* (2013.01); *G06T 2210/22* (2013.01); *H04N 1/3935* (2013.01); *H04N 5/2628* (2013.01)

(56) References Cited

U.S. PATENT DOCUMENTS

| | | | |
|---|---|---|---|
| 9,025,811 B1 | 5/2015 | Ioffe et al. | |
| 9,430,587 B2 | 8/2016 | van der Meulen et al. | |
| 9,588,990 B1 | 3/2017 | Ioffe et al. | |
| 2007/0065044 A1* | 3/2007 | Park | G06F 17/30247 382/305 |
| 2007/0282908 A1 | 12/2007 | Van der Meulen et al. | |
| 2009/0208118 A1 | 8/2009 | Csurka | |
| 2011/0016150 A1 | 1/2011 | Engstrom et al. | |
| 2014/0306999 A1 | 10/2014 | Yim et al. | |
| 2015/0116349 A1* | 4/2015 | Hamada | G06K 9/6254 345/619 |
| 2015/0169166 A1 | 6/2015 | Kim et al. | |
| 2015/0206034 A1* | 7/2015 | Park | G06F 17/30247 382/195 |
| 2016/0196350 A1* | 7/2016 | Mau | G06F 17/30256 707/706 |

OTHER PUBLICATIONS

European Patent Office, "Supplementary European Search Report," Application No. EP17837162.1, dated Apr. 17, 2019, 10 pages.

Kang, Hyunmo, et al., "Visualization Methods for Personal Photo Collections: Browsing and Searching in the PhotoFinder," 2000 IEEE International Conference on Multimedia and Expo. ICME2000. Proceedings. Latest Advances in the Fast Changing World of Multimedia, Jul. 30-Aug. 2, 2000, 5 pages.

Suh, Bongwon, et al. "Automatic Thumbnail Cropping and its Effectiveness," Proceedings of the 16th Annual ACM Symposium on user Interface Software and Technology, Vancouver, Canada, Nov. 2-5, 2003, 10 pages.

Thyssen, Anthony, "ImageMagick v6 Examples—Creating Thumbnails and Framing," ImageMagick.org, Feb. 2, 2004, 28 pages. https://web.archive.org/web/20160729174742/http://www.imagemagick.org/Usage/thumbnails/.

* cited by examiner

ELECTRONIC DEVICE AND METHOD FOR OUTPUTTING THUMBNAIL CORRESPONDING TO USER INPUT

CROSS-REFERENCE TO RELATED APPLICATION

This application claims the benefit under 35 U.S.C. § 119(a) of a Korean patent application filed on Aug. 1, 2016, in the Korean Intellectual Property Office and assigned Serial Number 10-2016-0098119, the entire disclosure of which is hereby incorporated by reference.

TECHNICAL FIELD

The present disclosure relates to a technology outputting a thumbnail corresponding to a user input.

BACKGROUND

With the development of mobile communication technologies, an electronic device such as a smartphone, a wearable device, or the like, equipped with a display has been widely supplied. The electronic device may execute various functions such as photographing a picture or a video, playing a music file or a video file, a game, the Internet, and the like through the display.

In addition to the functions described above, the electronic device may output a thumbnail of the photographed image through the display. The thumbnail may be a miniaturized image and may be included as a data form in an image file. For example, information about the thumbnail may be included in metadata of an image (e.g., EXIF information). As another example, the electronic device may collect the information about the thumbnail and may store the collected information about the thumbnail as a separate file (e.g., thumbs.db). If using the thumbnail, a user may quickly and easily find an image that he/she desires to look for in a large number of images.

According to various embodiments, the thumbnail is generated according to a specified rule in a batch without reflecting characteristics of an object included in an image. For example, the thumbnail may be generated in the square form including an area of a length and breadth having a specific range from the center of the image. As another example, the thumbnail may be generated by cropping a part of the image. For example, if the breadth of the image is longer than the length thereof, the thumbnail may be generated by cropping specific left and right areas of the image such that the aspect ratio is 1:1.

When the user checks images or verifies images included in a specific category in the gallery application, a number of images are displayed in a single screen in the form of the thumbnail. Since the thumbnail displays only a part of an image, it may be difficult for the user to find the desired image.

SUMMARY

To address the above-discussed deficiencies, it is a primary object to provide one or more advantages. Accordingly, an aspect of the present disclosure is to provide an electronic device capable of receiving a user input and outputting thumbnails corresponding to the user input.

In accordance with an aspect of the present disclosure, an electronic device includes a display, a memory that stores an image file including image data, which includes at least one object, and metadata, and a processor. The metadata includes information about an area corresponding to the object and identification information of the object. The processor is configured to output the area of the image file, which includes the identification information corresponding to a user input as a thumbnail of the image file, in the display in response to the user input.

In accordance with an aspect of the present disclosure, a method for outputting a thumbnail includes obtaining image data including at least one object, information about an area corresponding to the object, and identification information of the object, obtaining an area of an image file including the identification information corresponding to a user input in response to the user input, and outputting the area as a thumbnail of the image file in a display.

In accordance with an aspect of the present disclosure, a storage medium storing an computer-readable instruction, when executed by an electronic device, causes the electronic device to obtain image data including at least one object, information about an area corresponding to the object, and identification information of the object from an image file, to obtain the area of the image file including the identification information corresponding to a user input in response to the user input, and to output the area as a thumbnail of the image file in a display.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
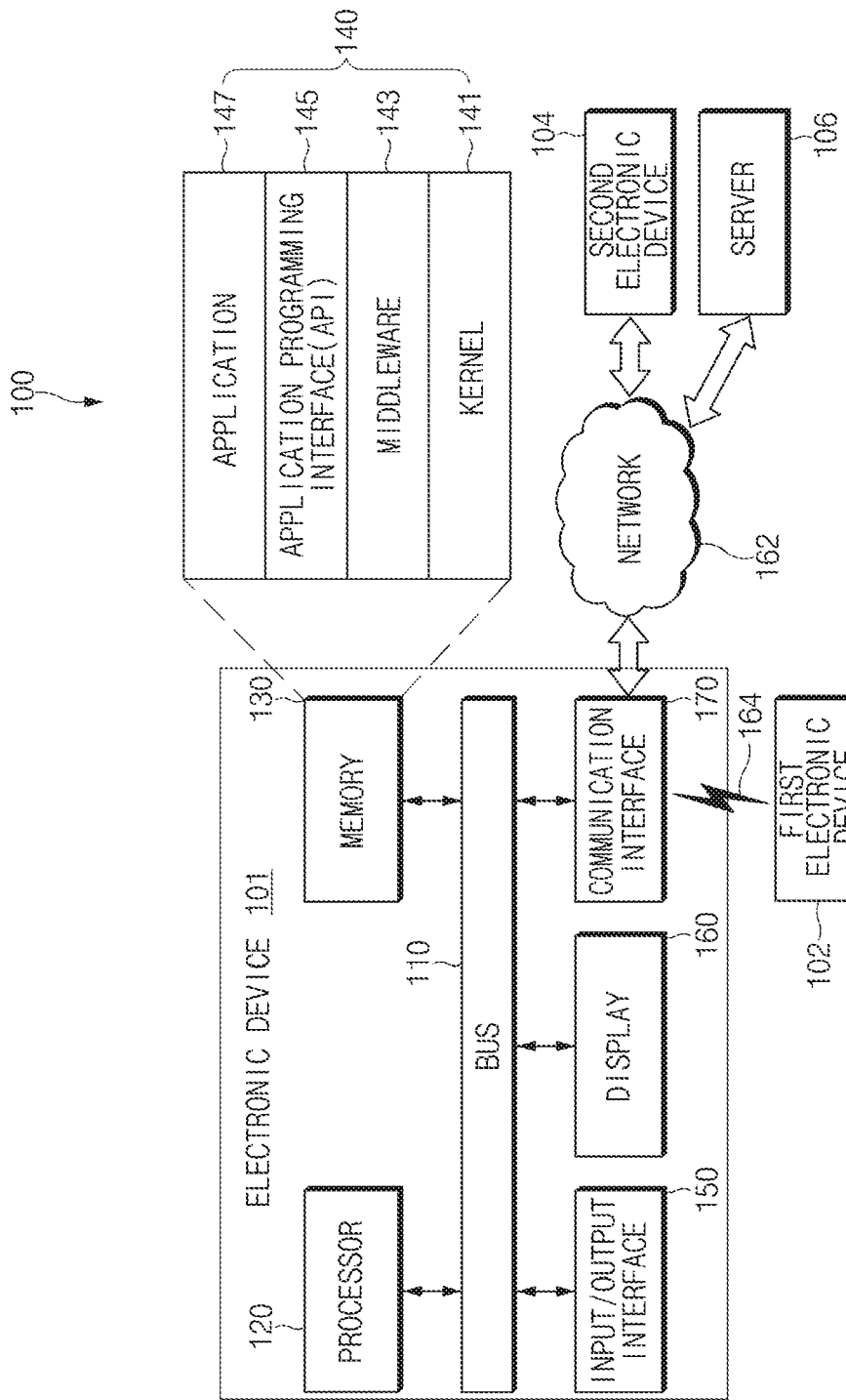
FIG. 1 illustrates an electronic device in a network environment system, according to an embodiment.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In this disclosure, the expressions "have", "may have", "include" and "comprise", or "may include" and "may comprise" used herein indicate existence of corresponding features (e.g., elements such as scores, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present invention. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an electronic device in a network environment system, according to an embodiment.

Referring to FIG. 1, according to various embodiments, an electronic device 101, a first electronic device 102, a second electronic device 104, or a server 106 may be connected each other over a network 162 or a short range communication 164. The electronic device 101 may include a bus 110, a processor 120, a memory 130, an input/output interface 150, a display 160, and a communication interface 170. According to an embodiment, the electronic device 101 may not include at least one of the above-described elements or may further include other element(s).

For example, the bus 110 may interconnect the above-described elements 110 to 170 and may include a circuit for conveying communications (e.g., a control message and/or data) among the above-described elements.

The processor 120 may include one or more of a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits an instruction or data input from a user or another external device, to other element(s) of the electronic device 101. Furthermore, the input/output interface 150 may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 164. The short range communication 164 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the first electronic device 102, the second electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at another device (e.g., the electronic device 102 or 104 or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
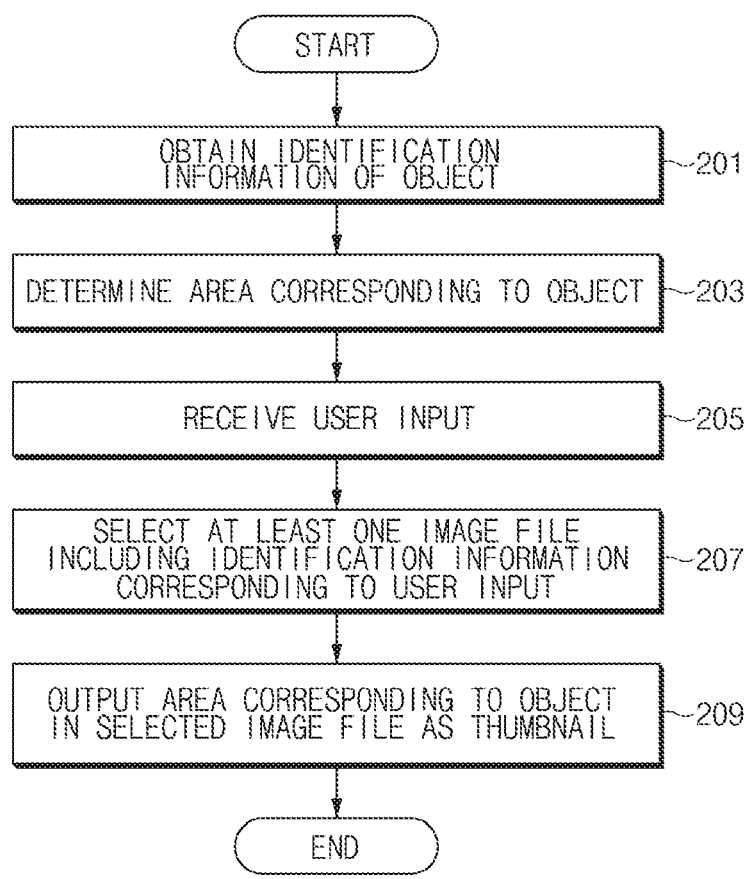
FIG. 2 is a flowchart that outputs a thumbnail, according to an embodiment.

FIG. 2 is a flowchart that outputs a thumbnail, according to an embodiment. According to an embodiment of the present invention, details described in FIG. 1 may be identically applied to elements having the same reference numerals as the electronic device 100 described in FIG. 1.

Referring to FIG. 2, in operation 201, the processor 120 may obtain identification information of an object included in image data. In the present disclosure, the image data may be referred to an image. The object may be a person, an animal, a building, or the like included in the image data, and the object included in the image data may be at least one or more objects.

The object may be classified into one or more categories. For example, the object may be classified as a person, an animal, a plant, an object, and the like, and the category into which the object is capable of being classified is not limited to the above-described example. The image data may include identification information of each of objects included in the category and identification information of the category. The identification information of the category may be an average value of identification information of objects included in the category.

The identification information may be information for distinguishing the at least one object, and may be, for example, a feature point, a feature vector, and a RGB value of the object. The processor 120 may obtain the identification information of the object from the image data by using Scale Invariant Feature Transform (SIFT), Histogram of Oriented Gradient (HOG), Haar feature, Ferns, Local Binary Pattern (LBP), or the like.

If the identification information is obtained, in operation 203, the processor 120 may obtain information about an area corresponding to an object. The information about the area may include a location that the object occupies, the size of the object, or the like in the image data. For example, the processor 120 may determine an area based on a score indicating a degree of coincidence of the identification information and feature information or may determine an area based on the category in which the object is included. If two or more objects are included in an image and areas of the objects overlap each other, the processor 120 may output only one area to the display 160. If the same object is included in the image, the processor 120 may merge each of areas and may output the merged area to the display 160.

If the identification information of the object and the information about the area corresponding to the object are obtained, the memory 130 may store the identification information of the object and the information about the area corresponding to the object as metadata. The metadata may be attribute information of the image data, and may further include, for example, a date and time at which the image was photographed, a date and time at which the image was stored, a focal distance, and the like.

As another example, the processor 120 may separate the metadata from the image data and may store the metadata in a separate database. The processor 120 may separate and store the information about the area corresponding to an object included in the metadata and the identification information of the object.

In operation 205, the processor 120 may receive a user input. The user input may be a character string for the user to search for an image, and may be received through the input/output interface 150. If the user input is received, in operation 207, the processor 120 may select at least one image file including the identification information corresponding to the user input. In the present disclosure, for example, the image file may mean information including image data (or image) and metadata.

According to an embodiment, the processor 120 may determine whether the identification information corresponding to the user input is present in the image file, using deep learning, object detection, or the like. The processor 120 may search for the identification information corresponding to the user input in the memory 130. For example, if user input is a puppy, the processor 120 may determine whether the puppy is present in the image file, using the identification information.

If the determination result indicates that the identification information corresponding to the user input is present, in operation 209, the processor 120 may output an area corresponding to the object as a thumbnail of the image file in the display 160. In the above-described example, if the puppy is present in the image file, the processor 120 may output the area, in which the puppy is included, as a thumbnail in the display 160.

Figure 3:
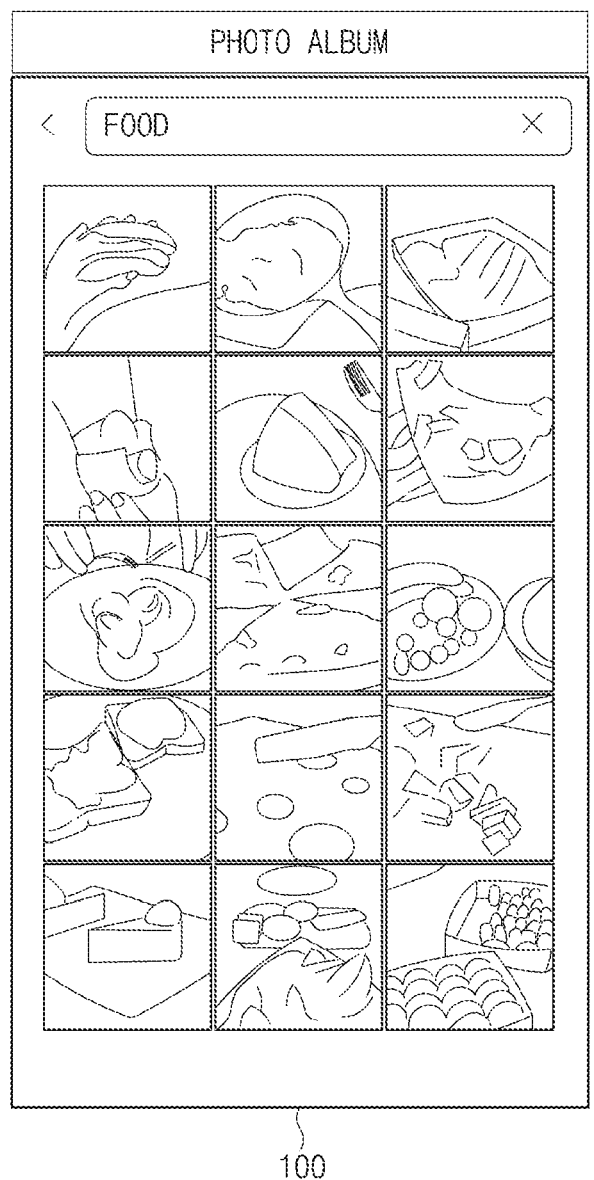
FIG. 3 illustrates an embodiment of an electronic device that crops image files in response to a user input and outputs cropped images.

FIG. 3 illustrates an electronic device that crops image files in response to a user input and outputs cropped images.

According to various embodiments, if the image files are cropped in response to a user input, only images for which a user desires to look may be output through a display. For example, when the user searches for food to find an image for the food, the electronic device 100 may search for image files having identification information about the food in response to a user input. According to various embodiments of the present invention, the electronic device 100 may determine an area of the identification information for which the user desires to look and may output the area through the display. According to an embodiment of the present invention, the time required for the user to search for the image files may be shortened.

Figure 4:
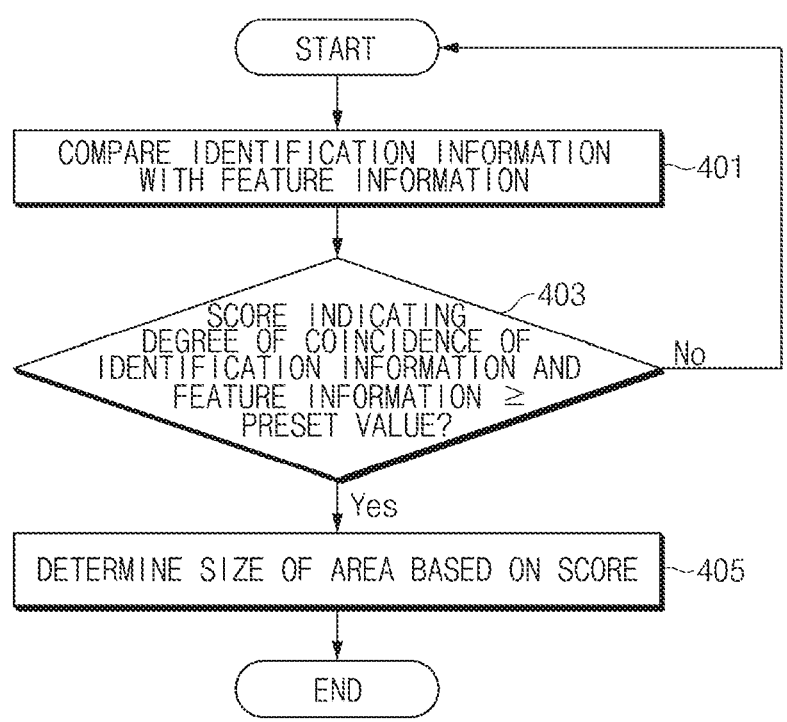
FIG. 4 is a flowchart for describing adjusting of a size of a thumbnail based on a degree of coincidence of identification information and feature information, according to an embodiment.
Figure 5:
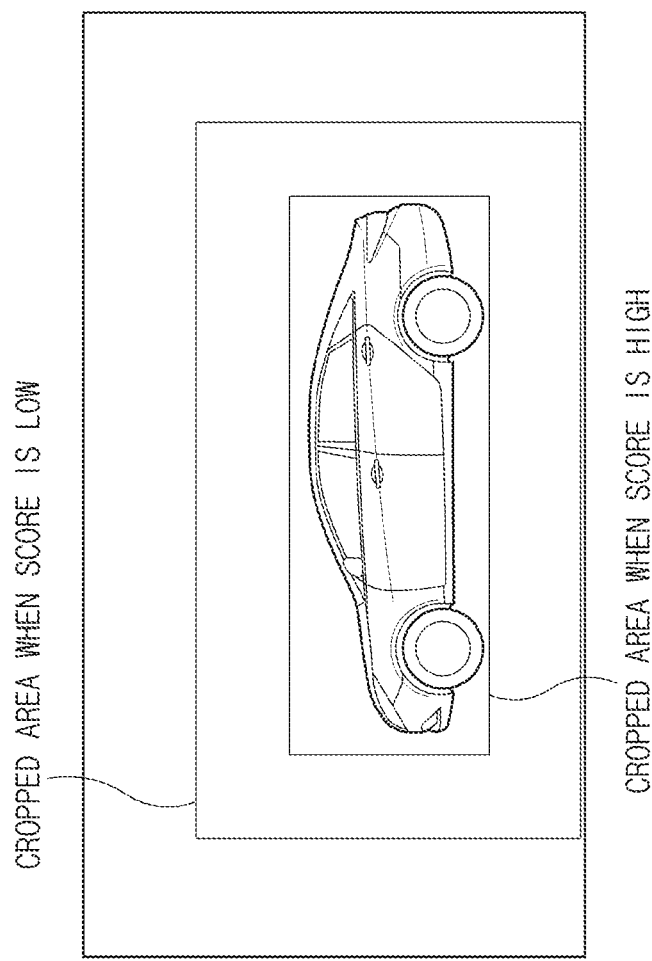
FIG. 5 is a view for describing cropping an image file based on a degree of coincidence of identification information and feature information, according to an embodiment.

FIG. 4 is a flowchart for describing adjusting of a size of a thumbnail based on a degree of coincidence of identification information and feature information, according to an embodiment. FIG. 5 is a view for describing cropping an image file based on a degree of coincidence of identification information and feature information, according to an embodiment.

Referring to FIG. 4, the memory 130 may store feature information indicating a feature of an object. The feature information may be a representative value indicating the feature of the object, and may be, for example, a general distribution of feature points, an average value of feature vectors, a distribution of RGB values, or the like. In operation 401, the processor 120 may compare the identification information with the feature information and may obtain a score indicating a degree to which the identification information is consistent with the feature information.

If the score is obtained, in operation 403, the processor 120 may compare the score with a preset value. If the comparison result indicates that the score is not less than the preset value, the processor 120 may be configured to output an area corresponding to the object as a thumbnail of an image file in the display 160. If the comparison result indicates that the score is less than the preset value, the processor 120 may search for identification information, which is consistent with the feature information stored in the memory 130, again. According to an embodiment of the present invention, an image for which a user desires to search may be accurately output by outputting a thumbnail in the display 160 based on the degree of coincidence of the identification information and the feature information.

If the comparison result in operation 403 indicates that the score is not less than the preset value, in operation 405, the processor 120 may determine the size of an area based on the score. For example, the processor 120 may extend the size of the area corresponding to the object if the score is high. The processor 120 may reduce the size of the area corresponding to the object if the score is low.

Referring to FIG. 5, feature information about a vehicle and identification information about the vehicle illustrated in FIG. 5 may be stored in the memory 130. The processor 120 may obtain the score indicating how the feature information stored in the memory 130 is the same as the identification information about the vehicle illustrated in FIG. 5. If the score is high, the processor 120 may be configured to output the cropped area as the thumbnail in the display 160 by narrowly cropping an image with respect to the vehicle in the image file illustrated in FIG. 5. If the score is low, the processor 120 may be configured to output the cropped area as the thumbnail in the display 160 by widely cropping an image with respect to the vehicle in the image file illustrated in FIG. 5.

Operation 403 is illustrated in FIG. 4 as being executed prior to operation 405. However, operation 405 may be executed prior to operation 403. For example, the processor 120 may crop an image based on the score. If the score is not less than a preset value, the processor 120 may output the cropped area as a thumbnail in the display 160.

Figure 6:
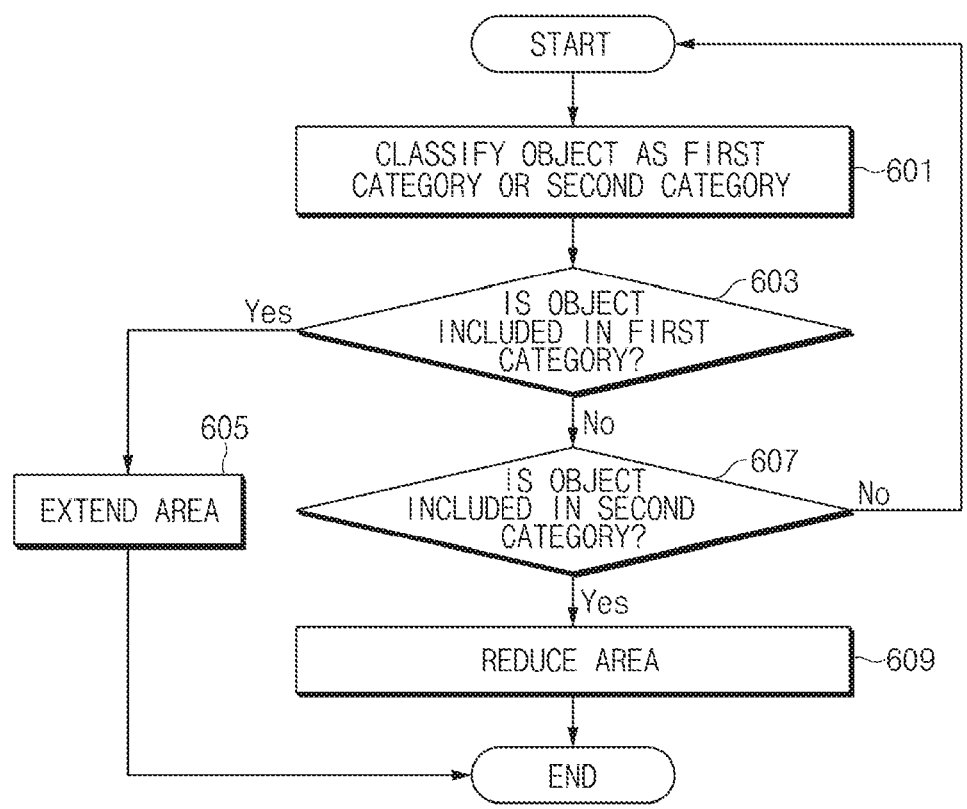
FIG. 6 is a flowchart for describing classifying of an object as a first category or a second category based on identification information, according to an embodiment.
Figure 7A:
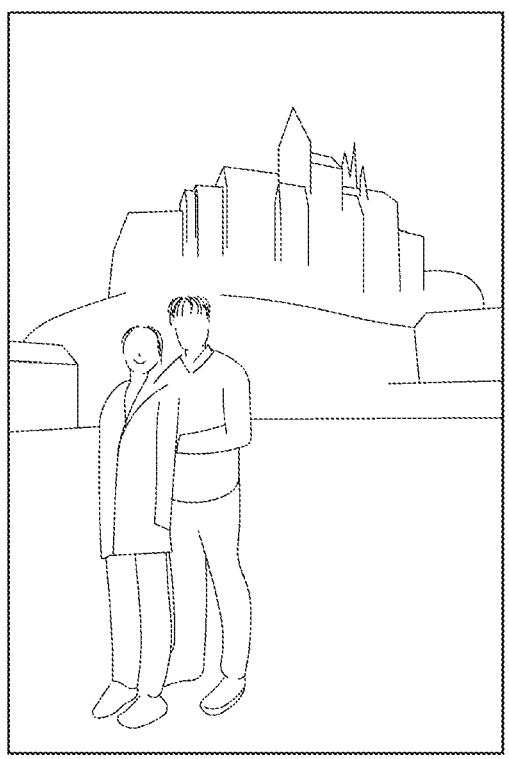
FIGS. 7A-7C are views for describing cropping an image file based on a category of an object, according to an embodiment.
Figure 7B:
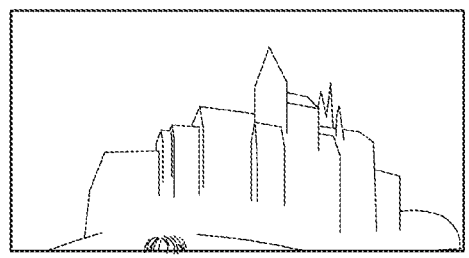
Figure 7C:
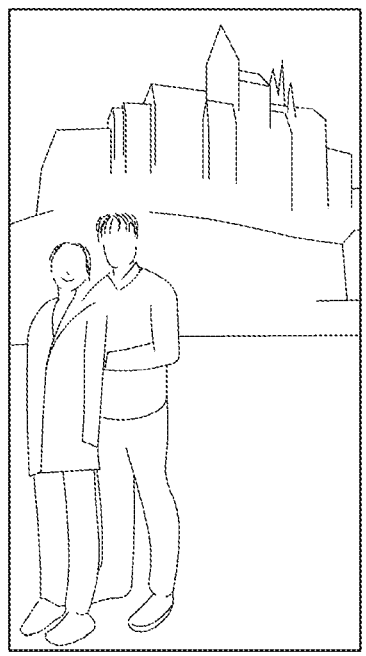

FIG. 6 is a flowchart for describing classifying of an object as a first category or a second category based on identification information, according to an embodiment. FIGS. 7A-7C are views for describing cropping an image file based on a category of an object, according to an embodiment.

Referring to FIG. 6, the thumbnail display area may be differently displayed depending on a type of the object. In operation 601, the processor 120 may classify an object as a first category or a second category based on identification information. The processor 120 may classify the object as the first category or the second category by comparing feature information and identification information described in FIG. 4. For example, if the object is a dog, the object may be classified as an animal category. If the object is a human, the object may be classified as a human category. If the processor 120 classifies the object as the first category or the second category, the memory 130 may store a category, in which the object is included, together with the identification information.

In operation 603, the processor 120 may determine whether the object is included in the first category. For example, the processor 120 may determine whether the object is included in the first category, by using deep learning, object detection, or the like.

If the determination result indicates that the object is included in the first category, in operation 605, the processor 120 may extend the size of an area corresponding to the object. If the determination result indicates that the object is not included in the first category, in operation 607, the processor 120 may determine whether the object is included in the second category. If the object is included in the second category, in operation 609, the processor 120 may reduce the size of the area corresponding to the object.

Referring to FIGS. 7A-7C, the first category may be a human, and the second category is a thing. In the case where the object is a human, the processor 120 may crop an image such that all the things around the object are included by extending the size of the area corresponding to the object. If the object is a building, the processor 120 may reduce the size of the area corresponding to the object such that only the building is included in the area. In the case where a human is included in the image, the relation between a human and a surrounding environment may be very important. According to an embodiment of the present invention, the size of a thumbnail may be adjusted depending on a user intention by cropping an image based on the classification of the category of the object.

Figure 8:
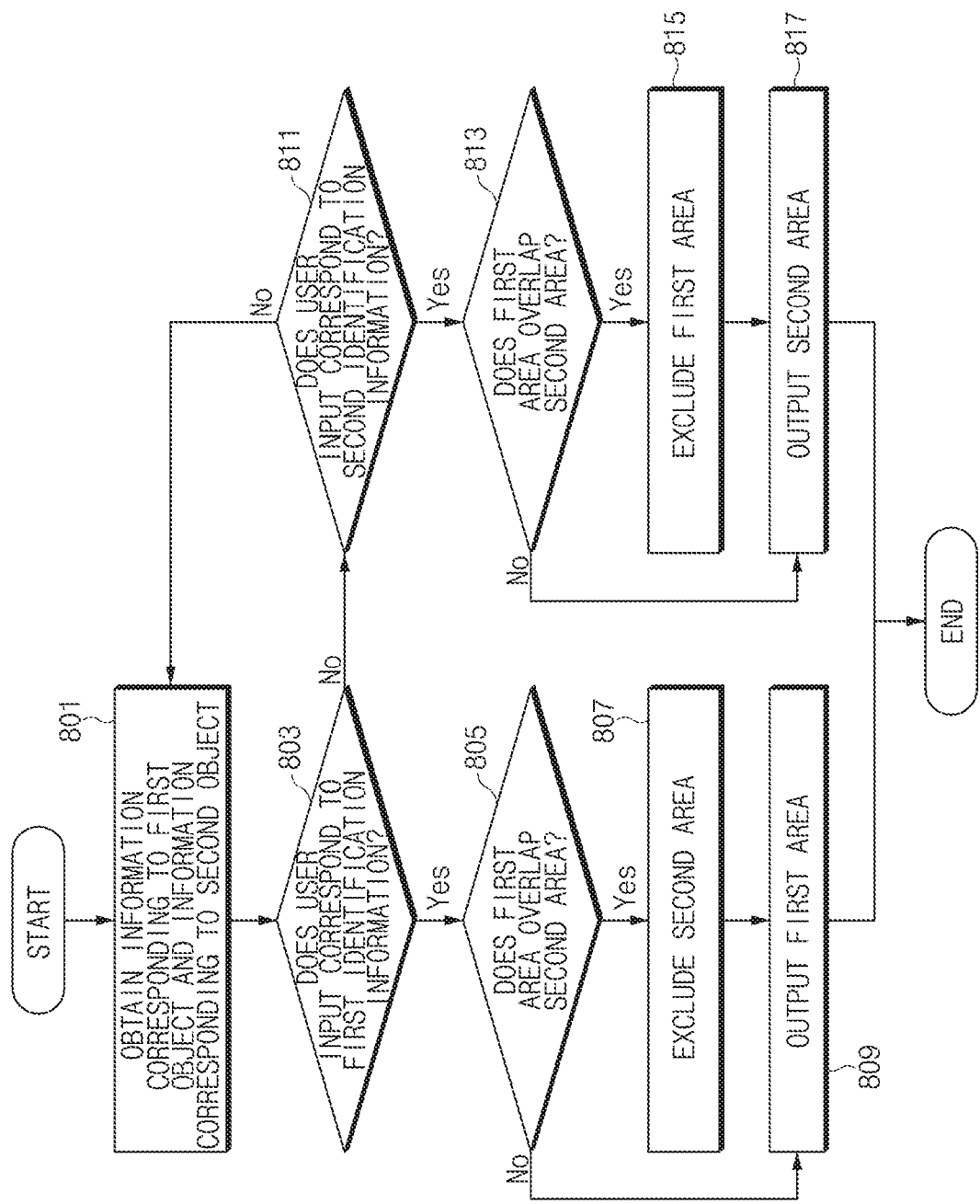
FIG. 8 is a flowchart for describing outputting of a first area or a second area as a thumbnail, according to an embodiment.
Figure 9A:
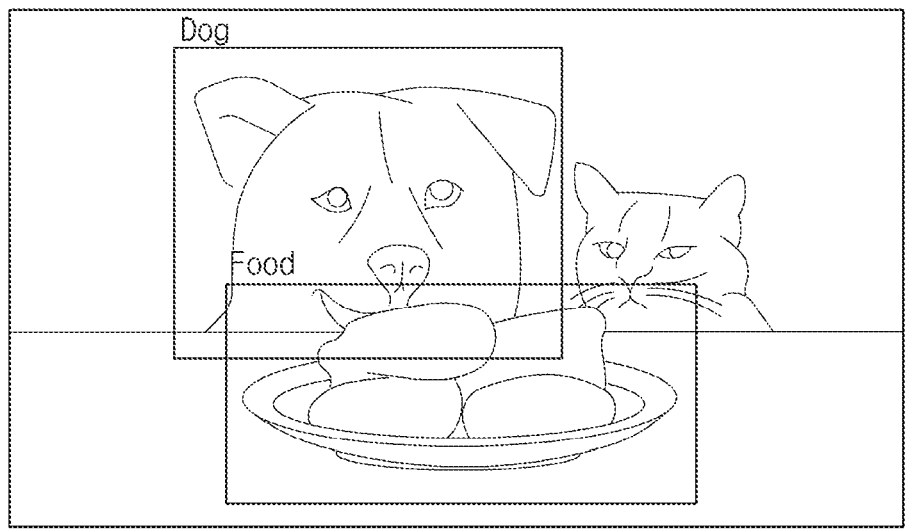
FIGS. 9A and 9B are views illustrating outputting of one of a first area or a second area as a thumbnail, according to an embodiment.
Figure 9B:
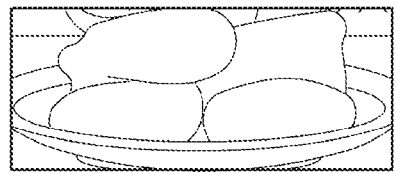

FIG. 8 is a flowchart for describing outputting of a first area or a second area as a thumbnail, according to an embodiment. FIGS. 9A and 9B are views illustrating outputting of one of a first area or a second area as a thumbnail, according to an embodiment.

Referring to FIG. 8, at least one object included in image data may include a first object and a second object. The processor 120 may obtain information about a first area corresponding to the first object and first identification information of the first object. The processor 120 may obtain information about a second area corresponding to the second object and second identification information of the second object. If the processor 120 obtains the pieces of information, the memory 130 may store the information about the first area and the first identification information, and the information about the second area and the second identification information, as metadata.

In operation 803, the processor 120 may determine whether a user input corresponds to the first identification information. If the determination result indicates that the user input corresponds to the first identification information, in operation 805, the processor 120 may determine whether the first area overlaps the second area. If the determination result indicates that the first area overlaps the second area, in operation 807, the processor 120 may exclude the second area. The processor 120 may store the remaining area excluding an overlapped area in the first area as the metadata.

If the second area is excluded, in operation 809, the processor 120 may be configured to output the first area as the thumbnail of the image file in the display 160. That is, the processor 120 may be configured to output the remaining area excluding an overlapped area in the first area as the thumbnail of the image file in the display 160. For example, the processor 120 may be configured to output the remaining area excluding an overlapped area in the first area as the thumbnail of the image file in the display 160 by using the metadata. In operation 805, if the first area and the second area do not overlap each other, the processor 120 may output the first area without excluding the second area.

In operation 803, if the user input does not correspond to the first identification information, in operation 811, the processor 120 may determine whether the user input corresponds to the second identification information. If the determination result indicates that the user input corresponds to the second identification information, in operation 813, the processor 120 may determine whether the first area overlaps the second area. If the determination result indicates that the first area overlaps the second area, in operation 815, the processor 120 may exclude the first area. The processor 120 may store the remaining area excluding an overlapped area in the second area as the metadata.

If the first area is excluded, in operation 817, the processor 120 may be configured to output the second area as the thumbnail of the image file in the display 160. That is, the processor 120 may be configured to output the remaining area excluding an overlapped area in the second area as the thumbnail of the image file in the display 160. For example, the processor 120 may be configured to output the remaining area excluding an overlapped area in the second area as the thumbnail of the image file in the display 160 by using the metadata. In operation 813, if the first area and the second area do not overlap each other, the processor 120 may output the second area without excluding the first area.

Referring to FIGS. 9A and 9B, a dog may be the first object, and a food may be the second object. The processor 120 may store information about an area, in an image, corresponding to the dog and information about an area, in an image, corresponding to the food in the memory 130. If the user input is input, the processor 120 may determine whether the user input corresponds to a dog or corresponds to a food. If the determination result indicates that the user input corresponds to the dog, the processor 120 may be configured to output the area corresponding to the dog in the display 160. If the determination result indicates that the user input corresponds to the food, the processor 120 may be configured to output the area corresponding to the food in the display 160.

According to an embodiment, the first area and the second area may be configured to at least partially overlap each other. In FIGS. 9A and 9B, the area corresponding to the dog and the area corresponding to the food may be configured to at least partially overlap each other. In the case where the first area and the second area overlap each other, the processor 120 may output the first area and the second area together, or may output only the overlapped part. As another example, each of the first area and the second area may be an independent area without overlapping each other.

Figure 10:
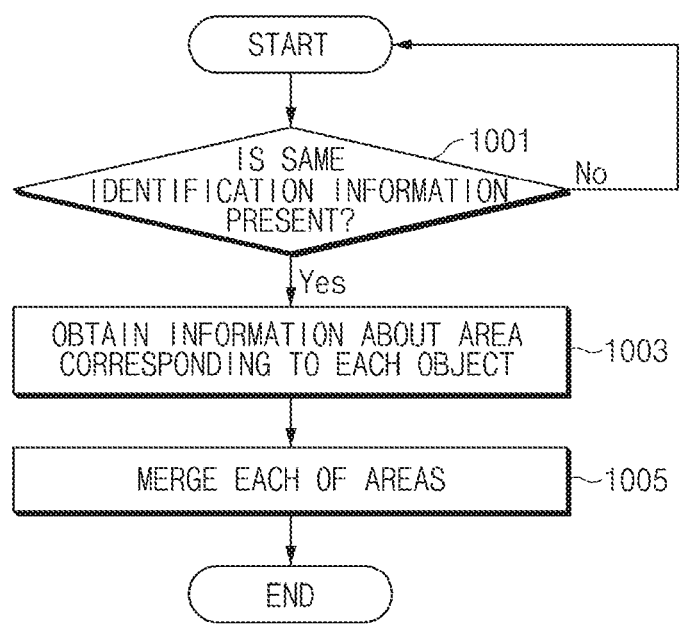
FIG. 10 is a flowchart for describing merging of areas corresponding to an object when the same object is present in an image file, according to an embodiment.
Figure 11A:
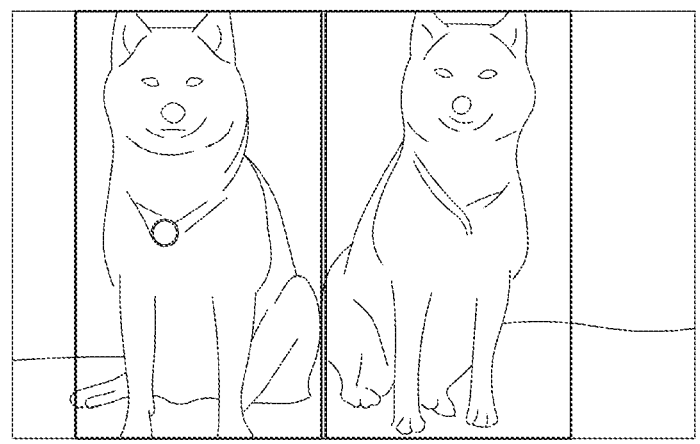
FIGS. 11A-11C are views illustrating outputting of a merged area as a thumbnail by cropping each of objects and merging cropped areas when the same object is present in an image file, according to an embodiment.
Figure 11B:
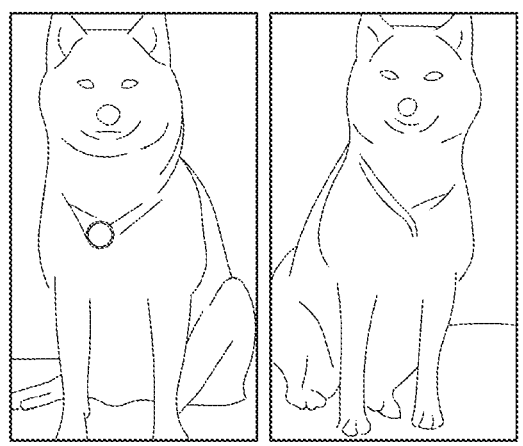
Figure 11C:
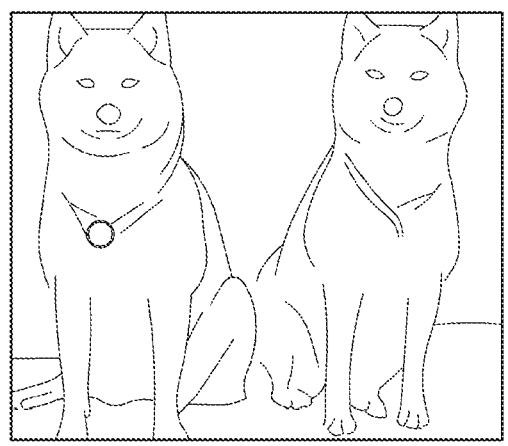

FIG. 10 is a flowchart for describing merging of areas corresponding to an object when the same object is present in an image file, according to an embodiment. FIGS. 11A-11C are views illustrating outputting of a merged area as a thumbnail by cropping each of objects and merging cropped areas when the same object is present in an image file, according to an embodiment.

Referring to FIG. 10, in operation 1001, the processor 120 may determine whether first identification information and second identification information are the same as each other. For example, the processor 120 may determine whether pieces of identification information corresponding to a user input are present. In addition, the processor 120 may determine whether pieces of identification information included in the same category are present.

The first identification information and the second identification information may be the same as the first identification information and the second identification information described in FIGS. 8 and 9. If the determination result indicates that the first identification information and the second identification information are the same as each other, in operation 1003, the processor 120 may obtain information about a first area and information about a second area. If information about an area is obtained, in operation 1005, the processor 120 may merge the first area and the second area. The first area and the second area may be the same as the first area and the second area described in FIGS. 8 and 9.

Referring to FIGS. 11A-11C, two dogs may be present in one image. The dogs illustrated may be the same dog or may be different dogs. The processor 120 may determine whether the dogs are the same as each other, based on identification information about each of dogs. If the determination result indicates that the dogs are the same as each other, the processor 120 may be configured to output the merged area in the display 160 by merging areas corresponding to the dogs. When determining whether the dogs are the same as each other, the processor 120 may determine that the dogs are the same as each other, based on a kind of a dog, or may determine that the dogs are the same as each other, if the object is a dog regardless of the kind of a dog.

According to various embodiments of the present invention, an electronic device may include a display, a memory that stores an image file including image data, which includes at least one object, and metadata, and a processor. The metadata includes information about an area corresponding to the object and identification information of the object. The processor may be configured to output the area of the image file, which includes the identification information corresponding to a user input as a thumbnail of the image file, in the display in response to the user input.

According to various embodiments of the present invention, the memory may store feature information indicating a feature of the object. The processor may adjust a size of the area based on a score indicating a degree of coincidence of the identification information and the feature information.

According to various embodiments of the present invention, the processor may be configured to output the area as the thumbnail of the image file in the display if the score is not less than a preset value.

According to various embodiments of the present invention, the processor may classify the object as a first category or a second category based on the identification information.

According to various embodiments of the present invention, the processor may extend a size of the area if the object is included in the first category and reduces the size of the area if the object is included in the second category.

According to various embodiments of the present invention, the at least one object may include a first object and a second object. The metadata may include information about a first area corresponding to the first object, first identification information of the first object, information about a second area corresponding to the second object, and second identification information of the second object. The processor may be configured to display the first area as the thumbnail of the image file in the display if the user input corresponds to the first identification information and to display the second area as the thumbnail of the image file in the display if the user input corresponds to the second identification information.

According to various embodiments of the present invention, the first area and the second area may be configured to at least partially overlap each other.

According to various embodiments of the present invention, if the first identification information is the same as the second identification information, the processor may be configured to merge the first area and the second area and to display the merged area as the thumbnail of the image file in the display.

According to various embodiments of the present invention, the memory may store the user input and the identification information corresponding to the user input.

According to various embodiments of the present invention, the display and the processor may be electrically connected. The display may provide a user interface (UI) for receiving the user input.

According to various embodiments of the present invention, a method for outputting a thumbnail may include obtaining image data including at least one object, information about an area corresponding to the object, and identification information of the object, obtaining an area of an image file including the identification information corresponding to a user input in response to the user input, and outputting the area as a thumbnail of the image file in a display.

According to various embodiments of the present invention, the obtaining of the image data including the at least one object, the information about the area corresponding to the object, and the identification information of the object may include obtaining feature information indicating a feature of the object and adjusting a size of the area based on a score indicating a degree of coincidence of the identification information and the feature information.

According to various embodiments of the present invention, the outputting of the area as the thumbnail of the image file in the display may include outputting the area as the thumbnail of the image file in the display if the score is not less than a preset value.

According to various embodiments of the present invention, the obtaining of the image data including the at least one object, the information about the area corresponding to the object, and the identification information of the object may include classifying the object as a first category or a second category based on the identification information.

According to various embodiments of the present invention, the obtaining of the image data including the at least one object, the information about the area corresponding to the object, and the identification information of the object may include extending a size of the area if the object is included in the first category, and reducing the size of the area if the object is included in the second category.

According to various embodiments of the present invention, the at least one object may include a first object and a second object. The obtaining of the image data including the at least one object, the information about the area corresponding to the object, and the identification information of the object may include obtaining information about a first area corresponding to the first object, first identification information of the first object, information about a second area corresponding to the second object, and second identification information of the second object.

According to various embodiments of the present invention, the outputting of the area as the thumbnail of the image file in the display may include displaying the first area as the thumbnail of the image file in the display if the user input corresponds to the first identification information and displaying the second area as the thumbnail of the image file in the display if the user input corresponds to the second identification information.

According to various embodiments of the present invention, the obtaining of the image data including the at least one object, the information about the area corresponding to the object, and the identification information of the object further may include merging the first area and the second area if the first identification information is the same as the second identification information, and the outputting of the area as the thumbnail of the image file in the display may include displaying the merged area as the thumbnail of the image file in the display.

According to various embodiments of the present invention, the obtaining of the image data including the at least one object, the information about the area corresponding to the object, and the identification information of the object may include obtaining the identification information corresponding to the user input.

According to various embodiments of the present invention, a storage medium storing an computer-readable instruction, when executed by an electronic device, may cause the electronic device to obtain image data including at least one object, information about an area corresponding to the object, and identification information of the object from an image file, to obtain the area of the image file including the identification information corresponding to a user input in response to the user input, and to output the area as a thumbnail of the image file in a display.

Figure 12:
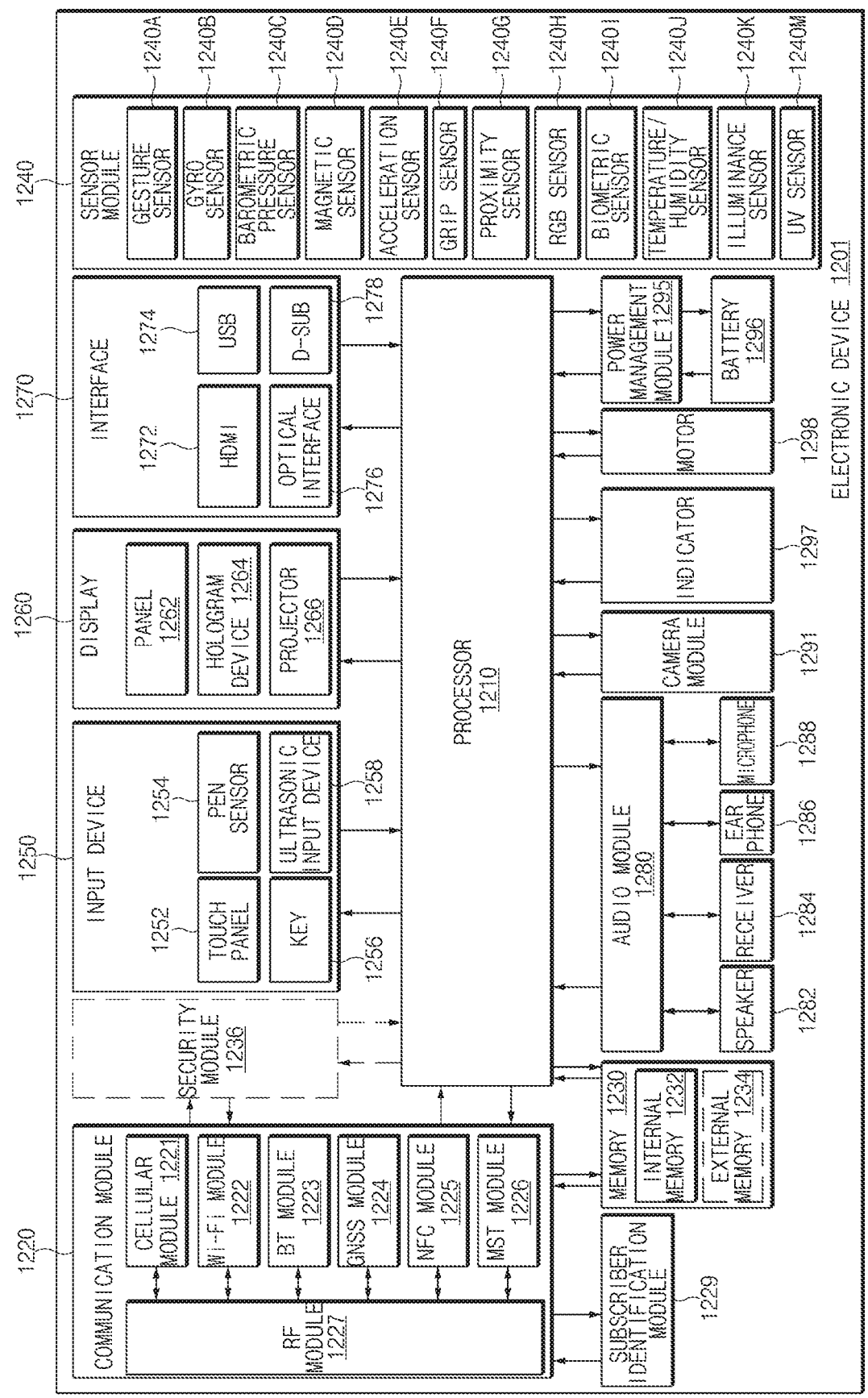
FIG. 12 illustrates a block diagram of an electronic device, according to an embodiment.

FIG. 12 illustrates a block diagram of an electronic device, according to an embodiment.

Referring to FIG. 12, an electronic device 1201 may include, for example, all or a part of the electronic device 101 illustrated in FIG. 1. The electronic device 1201 may include one or more processors (e.g., an application processor (AP)) 1210, a communication module 1220, a subscriber identification module 1229, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may drive, for example, an operating system (OS) or an application to control a plurality of hardware or software elements connected to the processor 1210 and may process and compute a variety of data. For example, the processor 1210 may be implemented with a System on Chip (SoC). According to an embodiment, the processor 1210 may further include a graphic processing unit (GPU) and/or an image signal processor. The processor 1210 may include at least a part (e.g., a cellular module 1221) of elements illustrated in FIG. 12. The processor 1210 may load an instruction or data, which is received from at least one of other elements (e.g., a nonvolatile memory), into a volatile memory and process the loaded instruction or data. The processor 1210 may store a variety of data in the nonvolatile memory.

The communication module 1220 may be configured the same as or similar to the communication interface 170 of FIG. 1. The communication module 1220 may include the cellular module 1221, a Wi-Fi module 1222, a Bluetooth (BT) module 1223, a GNSS module 1224 (e.g., a GPS module, a Glonass module, a Beidou module, or a Galileo module), a near field communication (NFC) module 1225, a MST module 1226 and a radio frequency (RF) module 1227.

The cellular module 1221 may provide, for example, voice communication, video communication, a character service, an Internet service, or the like over a communication network. According to an embodiment, the cellular module 1221 may perform discrimination and authentication of the electronic device 1201 within a communication network by using the subscriber identification module (e.g., a SIM card) 1229. According to an embodiment, the cellular module 1221 may perform at least a portion of functions that the processor 1210 provides. According to an embodiment, the cellular module 1221 may include a communication processor (CP).

Each of the Wi-Fi module 1222, the BT module 1223, the GNSS module 1224, the NFC module 1225, or the MST module 1226 may include a processor for processing data exchanged through a corresponding module, for example. According to an embodiment, at least a part (e.g., two or more) of the cellular module 1221, the Wi-Fi module 1222, the BT module 1223, the GNSS module 1224, the NFC module 1225, or the MST module 1226 may be included within one Integrated Circuit (IC) or an IC package.

For example, the RF module 1227 may transmit and receive a communication signal (e.g., an RF signal). For example, the RF module 1227 may include a transceiver, a power amplifier module (PAM), a frequency filter, a low noise amplifier (LNA), an antenna, or the like. According to another embodiment, at least one of the cellular module 1221, the Wi-Fi module 1222, the BT module 1223, the GNSS module 1224, the NFC module 1225, or the MST module 1226 may transmit and receive an RF signal through a separate RF module.

The subscriber identification module 1229 may include, for example, a card and/or embedded SIM that includes a subscriber identification module and may include unique identifying information (e.g., integrated circuit card identifier (ICCID)) or subscriber information (e.g., integrated mobile subscriber identity (IMSI)).

The memory 1230 (e.g., the memory 130) may include an internal memory 1232 or an external memory 1234. For example, the internal memory 1232 may include at least one of a volatile memory (e.g., a dynamic random access memory (DRAM), a static RAM (SRAM), a synchronous DRAM (SDRAM), or the like), a nonvolatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1234 may be operatively and/or physically connected to the electronic device 1201 through various interfaces.

A security module 1236 may be a module that includes a storage space of which a security level is higher than that of the memory 1230 and may be a circuit that guarantees safe data storage and a protected execution environment. The security module 1236 may be implemented with a separate circuit and may include a separate processor. For example, the security module 1236 may be in a smart chip or a secure digital (SD) card, which is removable, or may include an embedded secure element (eSE) embedded in a fixed chip of the electronic device 1201. Furthermore, the security module 1236 may operate based on an operating system (OS) that is different from the OS of the electronic device 1201. For example, the security module 1236 may operate based on java card open platform (JCOP) OS.

The sensor module 1240 may measure, for example, a physical quantity or may detect an operation state of the electronic device 1201. The sensor module 1240 may convert the measured or detected information to an electric signal. For example, the sensor module 1240 may include at least one of a gesture sensor 1240A, a gyro sensor 1240B, a barometric pressure sensor 1240C, a magnetic sensor 1240D, an acceleration sensor 1240E, a grip sensor 1240F, the proximity sensor 1240G, a color sensor 1240H (e.g., red, green, blue (RGB) sensor), a biometric sensor 1240I, a temperature/humidity sensor 1240J, an illuminance sensor 1240K, or an UV sensor 1240M. Although not illustrated, additionally or generally, the sensor module 1240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling at least one or more sensors included therein. According to an embodiment, the electronic device 1201 may further include a processor that is a part of the processor 1210 or independent of the processor 1210 and is configured to control the sensor module 1240. The processor may control the sensor module 1240 while the processor 1210 remains at a sleep state.

The input device 1250 may include, for example, a touch panel 1252, a (digital) pen sensor 1254, a key 1256, or an ultrasonic input unit 1258. For example, the touch panel 1252 may use at least one of capacitive, resistive, infrared and ultrasonic detecting methods. Also, the touch panel 1252 may further include a control circuit. The touch panel 1252 may further include a tactile layer to provide a tactile reaction to a user.

The (digital) pen sensor 1254 may be, for example, a part of a touch panel or may include an additional sheet for recognition. The key 1256 may include, for example, a physical button, an optical key, a keypad, or the like. The ultrasonic input device 1258 may detect (or sense) an ultrasonic signal, which is generated from an input device, through a microphone (e.g., a microphone 1288) and may check data corresponding to the detected ultrasonic signal.

The display 1260 (e.g., the display 160) may include a panel 1262, a hologram device 1264, or a projector 1266. The panel 1262 may be the same as or similar to the display 160 illustrated in FIG. 1. The panel 1262 may be implemented, for example, to be flexible, transparent or wearable. The panel 1262 and the touch panel 1252 may be integrated into a single module. The hologram device 1264 may display a stereoscopic image in a space using a light interference phenomenon. The projector 1266 may project light onto a screen so as to display an image. For example, the screen may be arranged in the inside or the outside of the electronic device 1201. According to an embodiment, the display 1260 may further include a control circuit for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature (D-sub) 1278. The interface 1270 may be included, for example, in the communication interface 170 illustrated in FIG. 1. Additionally or generally, the interface 1270 may include, for example, a mobile high definition link (MHL) interface, a SD card/multi-media card (MMC) interface, or an infrared data association (IrDA) standard interface.

The audio module 1280 may convert a sound and an electric signal in dual directions. At least a part of the audio module 1280 may be included, for example, in the input/output interface 150 illustrated in FIG. 1. The audio module 1280 may process, for example, sound information that is input or output through a speaker 1282, a receiver 1284, an earphone 1286, or the microphone 1288.

For example, the camera module 1291 may shoot a still image or a video. According to an embodiment, the camera module 1291 may include at least one or more image sensors (e.g., a front sensor or a rear sensor), a lens, an image signal processor (ISP), or a flash (e.g., an LED or a xenon lamp).

The power management module 1295 may manage, for example, power of the electronic device 1201. According to an embodiment, a power management integrated circuit (PMIC), a charger IC, or a battery or fuel gauge may be included in the power management module 1295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, and the like. The motor 1298 may convert an electrical signal into a mechanical vibration and may generate the following effects: vibration, haptic, and the like. Although not illustrated, a processing device (e.g., a GPU) for supporting a mobile TV may be included in the electronic device 1201. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 13:
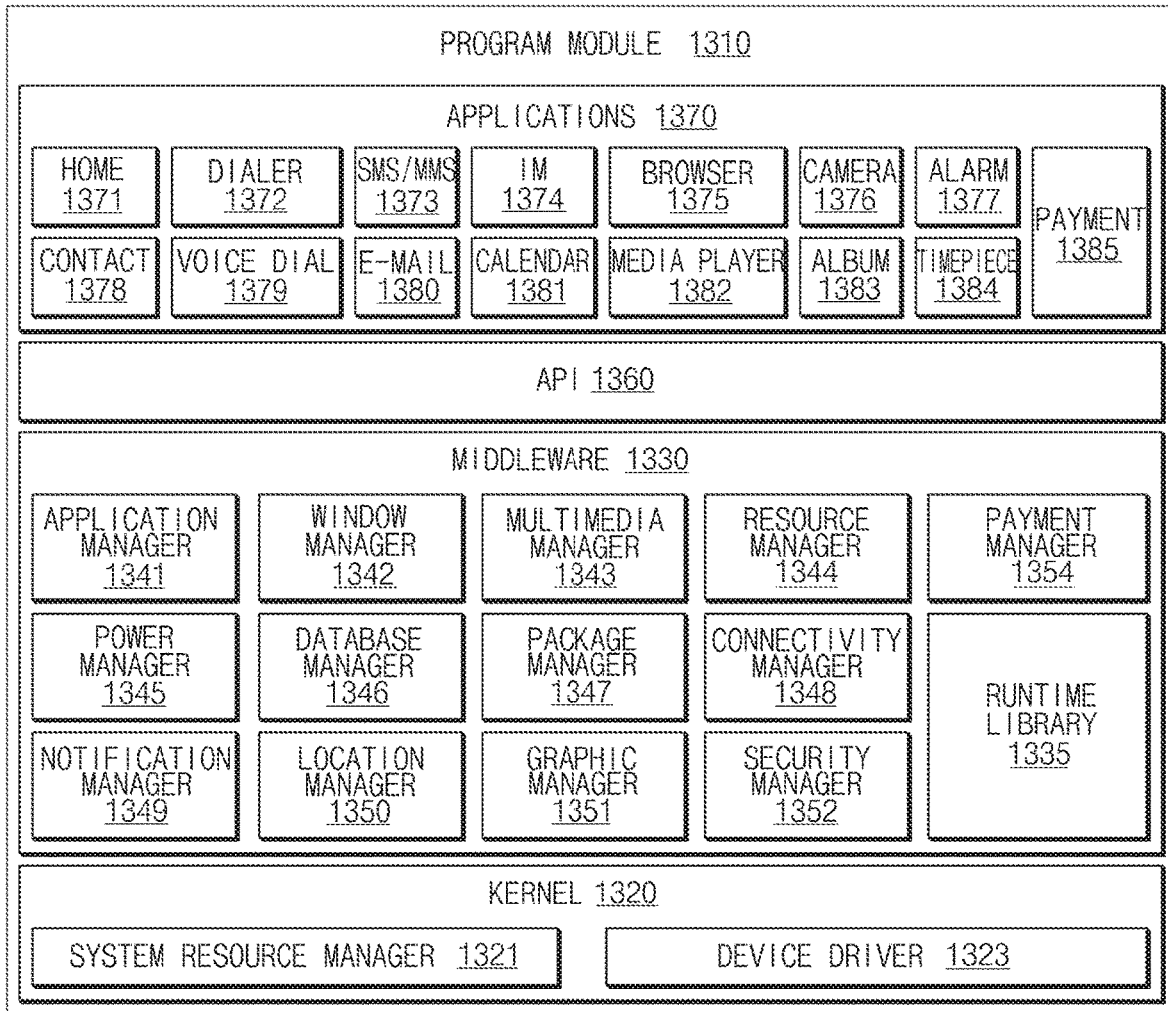
FIG. 13 illustrates a block diagram of a program module, according to various embodiments.

FIG. 13 illustrates a block diagram of a program module, according to various embodiments.

According to an embodiment, a program module 1310 (e.g., the program 140) may include an operating system (OS) to control resources associated with an electronic device (e.g., the electronic device 101), and/or diverse applications (e.g., the application program 147) driven on the OS. The OS may be, for example, Android, iOS, Windows, Symbian, or Tizen.

The program module 1310 may include a kernel 1320, a middleware 1330, an application programming interface (API) 1360, and/or an application 1370. At least a portion of the program module 1310 may be preloaded on an electronic device or may be downloadable from an external electronic device (e.g., the first electronic device 102, the second electronic device 104, the server 106, or the like).

The kernel 1320 (e.g., the kernel 141) may include, for example, a system resource manager 1321 or a device driver 1323. The system resource manager 1321 may perform control, allocation, or retrieval of system resources. According to an embodiment, the system resource manager 1321 may include a process managing unit, a memory managing unit, or a file system managing unit. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330 may provide, for example, a function that the application 1370 needs in common, or may provide diverse functions to the application 1370 through the API 1360 to allow the application 1370 to efficiently use limited system resources of the electronic device. According to an embodiment, the middleware 1330 (e.g., the middleware 143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, or a payment manager 1354.

The runtime library 1335 may include, for example, a library module that is used by a compiler to add a new function through a programming language while the application 1370 is being executed. The runtime library 1335 may perform input/output management, memory management, or capacities about arithmetic functions.

The application manager 1341 may manage, for example, a life cycle of at least one application of the application 1370. The window manager 1342 may manage a graphic user interface (GUI) resource that is used in a screen. The multimedia manager 1343 may identify a format necessary for playing diverse media files, and may perform encoding or decoding of media files by using a codec suitable for the format. The resource manager 1344 may manage resources such as a storage space, memory, or source code of at least one application of the application 1370.

The power manager 1345 may operate, for example, with a basic input/output system (BIOS) to manage a battery or power, and may provide power information for an operation of an electronic device. The database manager 1346 may generate, search for, or modify the database that is to be used in at least one application of the application 1370. The package manager 1347 may install or update an application that is distributed in the form of a package file.

The connectivity manager 1348 may manage, for example, wireless connection such as Wi-Fi or Bluetooth. The notification manager 1349 may display or notify an event such as arrival message, appointment, or proximity notification in a mode that does not disturb a user. The location manager 1350 may manage location information about an electronic device. The graphic manager 1351 may manage a graphic effect that is provided to a user, or manage a user interface relevant thereto. The security manager 1352 may provide a general security function necessary for system security, user authentication, or the like. According to an embodiment, in the case where an electronic device (e.g., the electronic device 101) includes a telephony function, the middleware 1330 may further include a telephony manager for managing a voice or video call function of the electronic device.

The middleware 1330 may include a middleware module that combines diverse functions of the above-described elements. The middleware 1330 may provide a module specialized to each OS kind to provide differentiated functions. Additionally, the middleware 1330 may dynamically remove a part of the preexisting elements or may add new elements thereto.

The API 1360 (e.g., the API 145) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1370 (e.g., the application program 147) may include, for example, one or more applications capable of providing functions for a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, and a timepiece 1384, or for offering health care (e.g., measuring an exercise quantity, blood sugar, or the like) or environment information (e.g., information of barometric pressure, humidity, temperature, or the like).

According to an embodiment, the application 1370 may include an application (hereinafter referred to as "information exchanging application" for descriptive convenience) to support information exchange between an electronic device (e.g., the electronic device 101) and an external electronic device (e.g., the first electronic device 102 or the second electronic device 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1370 may include an application (e.g., a health care application of a mobile medical device) that is assigned in accordance with an attribute of an external electronic device. According to an embodiment, the application 1370 may include an application that is received from an external electronic device (e.g., the first electronic device 102, the second electronic device 104, or the server 106). According to an embodiment, the application 1370 may include a preloaded application or a third party application that is downloadable from a server. The names of elements of the program module 1310 according to the embodiment may be modifiable depending on kinds of operating systems.

According to various embodiments, at least a portion of the program module 1310 may be implemented by software, firmware, hardware, or a combination of two or more thereof. At least a portion of the program module 1310 may be implemented (e.g., executed), for example, by the processor (e.g., the processor 1210). At least a portion of the program module 1310 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read-only memory (CD-ROM) and a digital versatile disc (DVD), a magneto-optical media (e.g., a floptical disk)), and hardware devices (e.g., a read-only memory (ROM), a random access memory (RAM), or a flash memory). Also, a program instruction may include not only a mechanical code such as things generated by a compiler but also a high-level language code executable by a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to various embodiments of the present invention, pieces of image information for which a user wants to search may be immediately verified.

Besides, a variety of effects directly or indirectly understood through this disclosure may be provided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
    a display;
    a memory configured to store image data comprising at least one identified object and metadata associated with the image data, wherein the metadata comprises identification information of the at least one identified object and information on an area corresponding to the at least one identified object; and
    at least one processor, coupled with the memory and the display, is configured to:
        output the area of the image data corresponding to the at least one identified object as a thumbnail of the image data on the display in response to a user input corresponding to the identification information, and
        wherein, based on a determined degree of coincidence between at least one feature of the at least one identified object and the identification information of the at least one identified object, a size of the area corresponding to the at least one identified object is determined.

2. The electronic device of claim 1, wherein the feature comprises one or more of a feature point, a feature vector, an RGB value of the at least one identified object or a representative value indicating a feature of the at least one identified object.

3. The electronic device of claim 1, wherein the processor is configured to:
    output the area of the image data corresponding to the at least one identified object as the thumbnail of the image data on the display if the degree of the coincidence is not less than a preset value.

4. The electronic device of claim 1, wherein the processor classifies the at least one identified object as included in a first category or as included in a second category based on the identification information.

5. The electronic device of claim 4, wherein the processor extends a size of the area corresponding to the at least one identified object if the at least one identified object is included in the first category, and the processor reduces the size of the area corresponding to the at least one identified object if the at least one identified object is included in the second category.

6. The electronic device of claim 1, wherein the at least one identified object includes a first object and a second object,
    wherein the metadata includes information about a first area corresponding to the first object, first identification information of the first object, information about a second area corresponding to the second object, and second identification information of the second object, and
    wherein the processor is configured to:
        display the first area as the thumbnail of the image data on the display if the user input corresponds to the first identification information, and
        display the second area as the thumbnail of the image data on the display if the user input corresponds to the second identification information.

7. The electronic device of claim 6, wherein the first area and the second area are configured to at least partially overlap each other.

8. The electronic device of claim 6, wherein if the first identification information matches the second identification information, the processor is configured to merge the first area and the second area into a merged area and to display the merged area as the thumbnail of the image data on the display.

9. The electronic device of claim 1, wherein the memory stores the user input and the identification information corresponding to the user input.

10. The electronic device of claim 1, wherein the display and the processor are electrically connected, and
    wherein the display provides a user interface (UI) for receiving the user input.

11. A method for outputting a thumbnail, the method comprising:
    obtaining image data comprising at least one identified object, information about an area corresponding to the at least one identified object, and identification information of the at least one identified object;
    obtaining an area of the image data corresponding to the at least one identified object in response to a user input corresponding to the identification information, wherein a size of the area corresponding to the at least one identified object is determined based on a determined degree of coincidence between at least one feature of the at least one identified object and the identification information of the at least one identified object; and
    outputting the area corresponding to the at least one identified object of the image data as a thumbnail of the image data on a display.

12. The method of claim 11, wherein the feature comprises one or more of a feature point, a feature vector, an RGB value of the at least one object or a representative value indicating a feature of the at least one identified object.

13. The method of claim 11, wherein the outputting of the area corresponding to the at least one identified object as the thumbnail of the image data on the display includes:
    outputting the area corresponding to the at least one identified object as the thumbnail of the image data on the display if the determined degree of coincidence is not less than a preset value.

14. The method of claim 11, wherein the obtaining of the image data including the at least one identified object, the information about the area corresponding to the at least one identified object, and the identification information of the at least one identified object includes:

classifying the at least one object as included in a first category or as included in a second category based on the identification information.

15. The method of claim 14, wherein the obtaining of the image data including the at least one identified object, the information about the area corresponding to the at least one identified object, and the identification information of the at least one identified object includes:

extending a size of the area corresponding to the at least one identified object if the at least one identified object is included in the first category; and reducing the size of the area corresponding to the at least one identified object if the at least one identified object is included in the second category.

16. The method of claim 11, wherein the at least one identified object includes a first object and a second object, and wherein the obtaining of the image data including the at least one identified object, the information about the area corresponding to the at least one identified object, and the identification information of the at least one identified object includes:

obtaining information about a first area corresponding to the first object, first identification information of the first object, information about a second area corresponding to the second object, and second identification information of the second object.

17. The method of claim 16, wherein the outputting of the area corresponding to the at least one identified object as the thumbnail of the image data on the display includes:

displaying the first area as the thumbnail of the image data on the display if the user input corresponds to the first identification information; and displaying the second area as the thumbnail of the image data on the display if the user input corresponds to the second identification information.

18. The method of claim 16, wherein the obtaining of the image data including the at least one identified object, the information about the area corresponding to the at least one identified object, and the identification information of the at least one identified object further includes:

merging the first area and the second area into a merged area if the first identification information is equivalent to the second identification information, and wherein the outputting of the area corresponding to the at least one identified object as the thumbnail of the image data on the display includes:

displaying the merged area as the thumbnail of the image data on the display.

19. The method of claim 11, wherein the obtaining of the image data including the at least one identified object, the information about the area corresponding to the at least one identified object, and the identification information of the at least one identified object includes:

obtaining the identification information corresponding to the user input.

20. A non-transitory storage medium comprising instructions that, when executed by an electronic device, cause the electronic device to:

obtain image data comprising at least one identified object, information about an area corresponding to the at least one identified object, and identification information of the at least one identified object, obtain an area of the image data corresponding to the at least one identified object in response to a user input corresponding to the identification information, wherein a size of the area corresponding to the at least one identified object is determined based on a determined degree of coincidence between at least one feature of the at least one identified object and the identification information of the at least one identified object, and output the area corresponding to the at least one identified object as a thumbnail of the image data on a display.

* * * * *